Dec. 22, 1925.
M. H. SENECHAL
1,566,621
AUTOMOBILE SIGNAL
Filed May 12, 1924
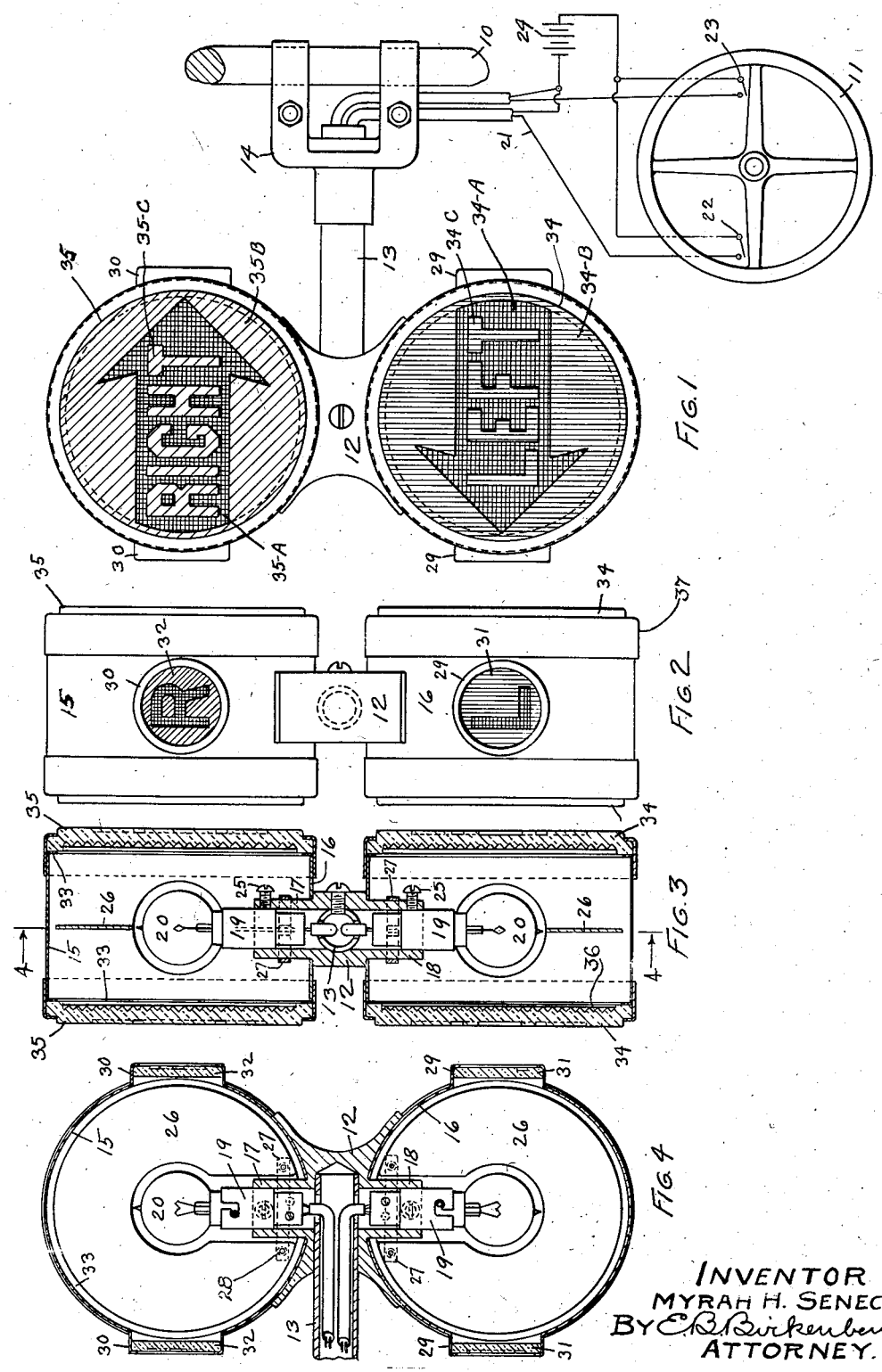
INVENTOR
MYRAH H. SENECHAL
BY *Birkenbeul*
ATTORNEY.

Patented Dec. 22, 1925.

1,566,621

UNITED STATES PATENT OFFICE.

MYRAH H. SENECHAL, OF PORTLAND, OREGON.

AUTOMOBILE SIGNAL.

Application filed May 12, 1924. Serial No. 712,759.

*To all whom it may concern:*

Be it known that I, MYRAH H. SENECHAL, a citizen of the United States, and a resident of Portland, in the county of Multnomah and State of Oregon, have invented a new and useful Automobile Signal, of which the following is a specification.

This invention relates more particularly to devices for indicating changes in direction about to be made or being made by a motor vehicle.

The first object of my invention is the provision of an exceedingly simple and efficient means for indicating right and left turns to be made by an automobile.

A second object is to so construct the device that colors long used in marine traffic may be successfully employed to aid vehicular traffic, and to employ word warnings in addition thereto to prevent possible confusion and to make them understandable by event colorblind people.

A third object is to so construct the device that the signal will be visible from four sides thereof and in a manner which will not make it easily misunderstood.

A fourth object is to so construct the device as to render it especially adapted to cheap manufacture.
I accomplish these results in the manner set forth in the following specification and illustrated in the accompanying drawing, in which:—

Figure 1 is a rear elevation of the device showing the manner of attaching same to a windshield frame. The appearance from the front of the device is the same, except that the arrows are reversed. Figure 2 is a side elevation of Figure 1. Figure 3 is a vertical section through the device of which Figure 4 is a transverse section taken along the line 4—4 in Figure 3.

Similar numbers of reference refer to the same parts throughout the several views.
Referring in detail to the drawing, I have illustrated a section of a windshield frame 10 and the conventional steering wheel 11 at a reduced scale. The device itself is built around a body 12 which is mounted on the tubular arm 13 which projects from the clamp 14 on the frame 10.

The upper and lower sides of the member 12 are curved to receive the cylindrical shells 15 and 16. Tubular projections 17 and 18 on the member 12 pass through the shells 15 and 16 and form receptacles for the sockets 19 of the lamps 20, which can be supplied with current through the wires 21 which pass through the arm 13 to the switches 22 and 23 on the wheel 11. Electrical energy may be supplied by means of the usual battery 24.

It is preferable to secure the sockets 19 in the receptacles 17 and 18 by means of the set screws 25. A dividing wall 26 is placed in the center of each of the cylinders 15 and 16, and these are cut away to clear the lamps 20 and the receptacles 19. Band clamps 27 around the receptacles 17 and 18 are secured to the walls 26 by means of the screws 28.

On the sides of the cylinders 15 and 16 are placed the circular frames 29 and 30, the former containing the red glass 31 bearing a large letter "L" as an abbreviation for left, and the latter bearing a green glass 32 on which is formed a large letter "R" as an abbreviation for the word right.

The cylinders have placed on their side edges flat wire rings 33 over which are placed the lenses 34 and 35. The former is of red glass having a black arrow $34^A$ formed therein with a red transparent background $34^B$ and word "Left" $34^C$ formed on the black arrow $34^A$.

The lenses 35 are of green glass and have a black indicating arrow $35^A$ formed thereon with a transparent green background $35^B$, and the transparent green word "Right" $35^C$ formed on the arrow $35^A$.

The rear side of each of the lenses 34 and 35 is broken up by many small prisms 36 which break up the rays from the lamps 20 and increase the range of visibility of the wording and arrows.

The interior of the device is preferably finished in white. Bezels 37 hold the lenses 34 and 35 in place and are a close fit over the ring 33 and the cylinders 15 and 16. The outer faces of the lenses are preferably in relief with the letters and background outside of the arrows.

In special instances the dividing walls 26 may be omitted, their function being to prevent light from shining through both lenses from the outside when the prismatic lenses are not employed.

I am aware that red and green lights have long been successfully used in marine transportation and that their use on land vehicles which, in the past have been relatively slow moving, are hardly necessary, since the speed at which horse-drawn vehicles travel and the weight of such conveyances, as well as the slight congestion, made it a matter of small import which way such vehicles might turn.

However today when the weight of the motor propelled vehicle is several times that of the old style buggy or wagon, and the speed is also increased many fold, it is evident that the momentum thereof is increased correspondingly. Therefore the necessity of keeping nearby pedestrians and motorists informed of contemplated changes in direction increase daily, and it is to accomplish this purpose that I have provided my device.

In operation, when the driver intends to turn to the left he illuminates the red signal bearing the word "Left," and when turning to the right he illuminates the green signal bearing the word "Right" or "Rite."

I am aware that many forms of automobile signals have been constructed in the past, some even employing red and green lights on different parts of the machine. I therefore do not claim my invention broadly, but I do intend to cover all such forms and modifications as fall fairly within the appended claims.

I claim:

1. A signaling device comprising two cylindrical lamp casings open at the ends; a double concave frame supporting the casings in positions parallel to and opposite each other, said frame having tubular lamp socket holders formed integrally therewith and projecting into each of the casings; a socket and lamp in each holder; a pair of semicircular band clamps secured around the base of each socket holder, each clamp providing a support within its respective casing for a partition having a cutout portion to clear the lamp and its socket holder; a tubular support arm received within the concave frame, the arm being provided with perforations opposite the bases of the lamp sockets for the passage of electrical conductors; means for securing the tubular arm in position; and translucent closures for the ends of the casings.

2. A signaling device comprising a casing open at its ends; a frame supporting said casing having a tubular lamp socket holder formed integrally therewith and projecting into said casing; a socket and lamp in said holder; a band clamp secured around the base of said socket holder, said clamp providing a support within the casing for a partition; a partition having a cutout portion to clear the lamp and its socket and holder; a tubular support arm received within the concave frame; means for securing the tubular arm in position; and translucent closures for the ends of the casing.

MYRAH H. SENECHAL.